United States Patent
Veness et al.

(10) Patent No.: US 12,408,622 B2
(45) Date of Patent: Sep. 9, 2025

(54) PET CARRIER

(71) Applicant: PLUTO OPCO (CAYMAN), LLC, George Town (KY)

(72) Inventors: David Veness, Fort Worth, TX (US); Jill Jackson, Fort Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 356 days.

(21) Appl. No.: 17/165,122

(22) Filed: Feb. 2, 2021

(65) Prior Publication Data

US 2021/0329879 A1    Oct. 28, 2021

Related U.S. Application Data

(60) Provisional application No. 63/016,383, filed on Apr. 28, 2020.

(51) Int. Cl.
*A01K 1/02* (2006.01)
(52) U.S. Cl.
CPC .................. *A01K 1/0245* (2013.01)
(58) Field of Classification Search
CPC .. A01K 1/0236; A01K 1/0245; A01K 1/0254; A01K 1/0272; A01K 1/0281; A01K 1/029
See application file for complete search history.

(56) References Cited

U.S. PATENT DOCUMENTS

| | | | | |
|---|---|---|---|---|
| 2,294,708 A | * | 9/1942 | Barnett | E05D 13/06 292/42 |
| 4,010,880 A | * | 3/1977 | Guillot-Munoz | A01K 1/0272 119/28.5 |
| 5,016,926 A | * | 5/1991 | Sharp | A01K 1/0245 292/42 |
| 6,588,373 B1 | * | 7/2003 | Strzempko | A01K 1/031 119/416 |
| 8,584,618 B1 | * | 11/2013 | Batson | A01K 1/0272 119/496 |
| 9,095,120 B1 | * | 8/2015 | Skaggs | A01K 1/0245 |
| D800,394 S | * | 10/2017 | Walter | A01K 1/0245 D30/112 |
| 10,653,106 B2 | * | 5/2020 | Northrop | A01K 1/0125 |

(Continued)

FOREIGN PATENT DOCUMENTS

GB    2486893 A   *  7/2012   ........... A01K 1/0245

OTHER PUBLICATIONS

Top Load Plastic Kennels, prior to Mar. 6, 2020, 8 pages.

*Primary Examiner* — Katelyn T Truong
(74) *Attorney, Agent, or Firm* — Foley & Lardner LLP (57) ABSTRACT

A carrier includes a body and a cover portion. The body has a bottom portion and a top portion and an opening in the top portion. The bottom portion is configured to be placed on a surface. The opening is the only opening sized and configured to enable an animal to enter or exit the body and enables an animal to enter or exit the body in a vertical manner when the bottom portion is placed on the surface. The cover portion is sized and configured to fit within the opening of the top portion. The cover portion is hingedly attached to the top portion at a first side and includes a latching mechanism at a second side. The latching mechanism enables the cover to be disposed in a latched state to close the opening in the top portion.

20 Claims, 12 Drawing Sheets

(56) References Cited

U.S. PATENT DOCUMENTS

| | | | |
|---|---|---|---|
| 2005/0035166 A1* | 2/2005 | Kresge | B62J 9/23 |
| | | | 224/431 |
| 2009/0114688 A1* | 5/2009 | Beeler | B62J 9/23 |
| | | | 119/500 |
| 2011/0017145 A1* | 1/2011 | Northrop | A01K 1/0254 |
| | | | 119/497 |
| 2011/0041774 A1* | 2/2011 | Northrop | A01K 1/0245 |
| | | | 119/500 |
| 2011/0079971 A1* | 4/2011 | Lulevitch | A01K 1/0245 |
| | | | 280/28.12 |
| 2011/0203528 A1* | 8/2011 | Northrop | A01K 1/033 |
| | | | 119/497 |
| 2012/0037083 A1* | 2/2012 | Greene | A01K 1/0245 |
| | | | 119/497 |
| 2013/0220231 A1* | 8/2013 | Hovsepian | B62J 9/24 |
| | | | 119/496 |
| 2015/0144070 A1* | 5/2015 | Qiu | E05C 9/04 |
| | | | 119/496 |
| 2016/0066535 A1* | 3/2016 | Anderson | A01K 1/0245 |
| | | | 119/473 |
| 2017/0318774 A1* | 11/2017 | Taylor | A01K 1/034 |
| 2018/0153134 A1* | 6/2018 | Hedley | A01K 1/0236 |
| 2018/0288964 A1* | 10/2018 | Tamiozzo | A01K 1/0245 |
| 2019/0183088 A1* | 6/2019 | Yang | A01K 1/0245 |
| 2019/0230894 A1* | 8/2019 | Pan | A01K 1/0272 |
| 2020/0060219 A1* | 2/2020 | Levin | A01K 1/033 |
| 2020/0296919 A1* | 9/2020 | Jakubowski | A01K 1/0245 |
| 2021/0120778 A1* | 4/2021 | Prehogan | A01K 31/08 |
| 2021/0329881 A1* | 10/2021 | Paxson | A01K 1/0245 |
| 2022/0378011 A1* | 12/2022 | Crampton | A01K 1/0356 |

* cited by examiner

PET CARRIER

RELATED APPLICATIONS

This application claims priority to U.S. Provisional Patent Application No. 63/016,383 filed on Apr. 28, 2020, which is hereby incorporated herein by reference.

BACKGROUND

Field of the Invention

The present disclosure relates to a pet carrier. In particular, the present invention relates to a pet carrier with a single opening in the top surface thereof.

Background Art

There are many types of conventional pet carriers that are designed to transport pets or animals. Many conventional carriers are plastic molded two-piece structures. When assembled, the two piece structures form an opening in the front of the carrier that enables an animal to enter and exit. These carriers can also include a handle on the top portion that enables the carrier to be carried.

SUMMARY

It has been determined that a need for an improved pet carrier exists. Many of the conventional pet carriers include an opening in the front of the carrier. As can be understood, it has been determined that many animals, in particular, cats, do not like being placed into the front of a carrier. The animal can resist, resulting in a difficult and dangerous situation. Accordingly, it has been determined that the front opening in many carriers is undesired or unused.

Therefore, it has been determined that a carrier having a single top loading opening is desired. A first aspect of such a carrier includes a body and a cover portion. The body has a bottom portion and a top portion and an opening in the top portion. The bottom portion is configured to be placed on a surface. The opening is the only opening sized and configured to enable an animal to enter or exit the body and enables an animal to enter or exit the body in a vertical manner when the bottom portion is placed on the surface. The cover portion is sized and configured to fit within the opening of the top portion. The cover portion is hingedly attached to the top portion at a first side and includes a latching mechanism at a second side. The latching mechanism enables the cover to be disposed in a latched state to close the opening in the top portion.

In a second aspect of the carrier according to the first aspect the cover portion has an opening therein.

In a third aspect of the carrier according to the first or second aspect, a wire grating at least partial blocks the opening in the cover portion.

In a fourth aspect of the carrier according to any of the previous aspects, the bottom portion is detachable from the top portion.

In a fifth aspect of the carrier according to any of the previous aspects, the latching mechanism is a spring loaded push button mechanism.

In a sixth aspect of the carrier according to any of the previous aspects, the latching mechanism includes at least one rod configured to enter an opening in the top portion.

In a seventh aspect of the carrier according to any of the previous aspects, the body is formed from plastic.

In an eighth aspect of the carrier according to any of the previous aspects, the cover portion includes a carrier handle is hingedly connected to the cover portion.

In a ninth aspect of the carrier according to any of the previous aspects, the top portion includes an edge configured to overlap an outside of the bottom portion.

In a tenth aspect of the carrier according to any of the previous aspects, the bottom portion is sized and configured to fit within an interior of the top portion when the bottom portion is inverted.

An eleventh aspect of the disclosure includes a method of forming a carrier. In this aspect the method comprises forming a bottom portion, the bottom portion configured to be placed on a surface, forming a top portion with an opening, the opening being the only opening sized and configured to enable an animal to enter or exit the body and enables an animal to enter or exit the body in a vertical manner when the bottom portion is placed on the surface, and positioning a cover portion within the opening of the top portion, the cover being hingedly attached to the top portion at a first side and including a latching mechanism at a second side, the latching mechanism enabling the cover to be disposed in a latched state to close the opening in the top portion.

In a twelfth aspect of the present invention according to any of the previous aspects, the positioning in the cover portion includes positioning the cover portion having an opening therein.

In a thirteenth aspect of the present invention according to any of the previous aspects, a wire grating at least partial blocks the opening in the cover portion.

A fourteenth aspect of the present invention according to any of the previous aspects, further includes attaching the bottom portion to the top portion.

In a fifteenth aspect of the present invention according to any of the previous aspects, the latching mechanism is a spring loaded push button mechanism.

In a sixteenth aspect of the present invention according to any of the previous aspects, the latching mechanism includes at least one rod configured to enter an opening in the top portion.

In a seventeenth aspect of the present invention according to any of the previous aspects, the forming the bottom portion and the forming the top portion include forming the bottom portion and forming the top portion from plastic.

An eighteenth aspect of the present invention according to any of the previous aspects, further includes hingedly connecting a carrier handle to the cover portion.

In a nineteenth aspect of the present invention according to any of the previous aspects, the top portion includes an edge configured to overlap an outside of the bottom portion.

A twentieth aspect of the present invention according to any of the previous aspects, further includes inverting the bottom portion and positioning the bottom portion within an interior of the top portion.

The embodiments disclosed herein provide a carrier with a single top loading opening for animals that reduces or eliminates the resistance from animals, resulting in an easier and safer situation in which an animal can be loaded.

BRIEF DESCRIPTION OF THE DRAWINGS

The invention will be explained in more detail hereinafter with reference to the drawings.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-6, a carrier 10 is illustrated in accordance with a first embodiment. The carrier 10 includes a body 12 with a bottom portion 14, a top portion 16 with an opening 18 therein and a cover portion 20.

Figure 7:
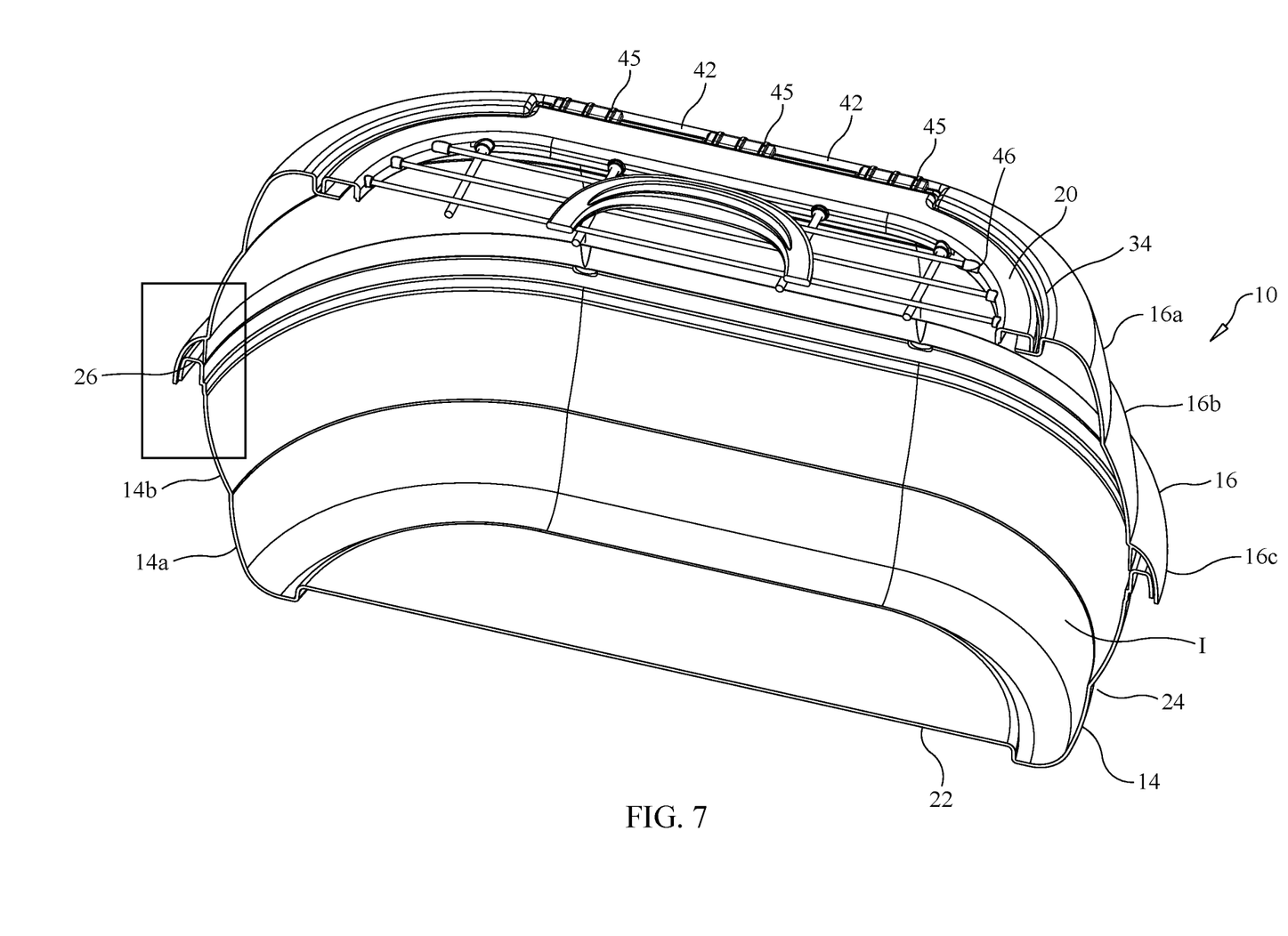
FIG. 7 is a cross section al view taken along line 7-7 of FIG. 4.

The bottom portion 14 is preferably a plastic molded structure with a bottom surface 22 and a wall surface 24 extending upwardly from the bottom surface 22. The wall surface 24 is generally oval and extends from the bottom surface at an angle other than 90 degrees, such that the wall surface 24 extends radially outwardly from the bottom surface 22. Such a configuration enables the interior I of the carrier 10 to increase in an upward direction, as shown in FIG. 7. This structure forms an increased interior area for the animal A or pet, while reducing the overall footprint of the carrier 10. In one embodiment the bottom portion 14 can have a stepped configuration in which the bottom portion 14 has a series of rings 14a and 14b that increase in cross sectional area in the upward direction. The sides of each of the rings 14a and 14b can have an arcuate configuration.

Figure 8:
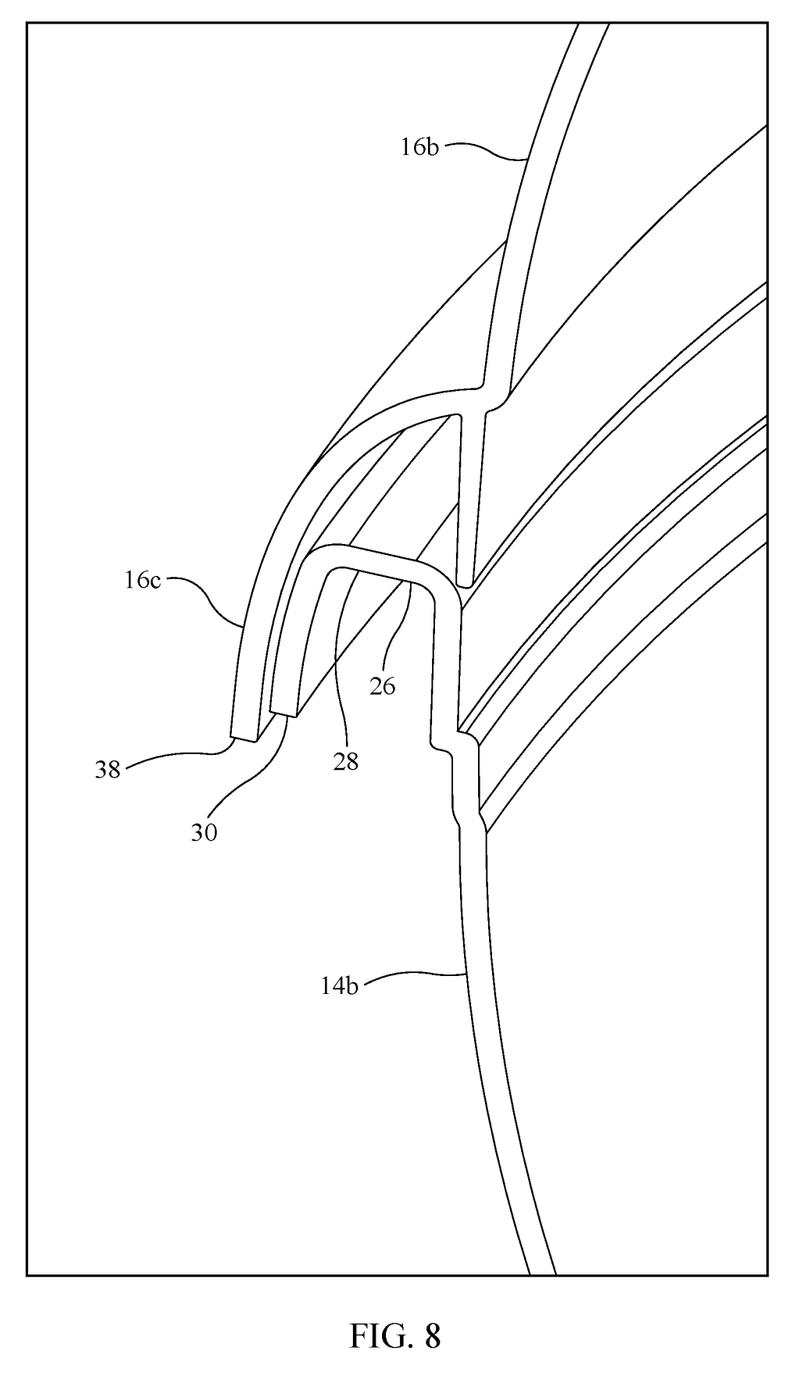
FIG. 8 is an enlarged cross section view of the connection between the top portion and the bottom portion.

As shown in FIGS. 7 and 8, the upper edge 26 of the bottom portion 14 can include an outwardly extending portion or flange 28 that is connected to a downwardly extended lip 30. The outwardly extending portion 28 can be configured to accept fasteners 32 that extend through the top portion 16 and into the bottom portion 14 to couple the top portion 16 to the bottom portion 14 as discussed in more detail below.

The top portion 16 is preferably a plastic molded structure with a top surface 34 and a wall surface 36 extending downwardly from the top surface 34. The wall surface 36 is generally oval and extends from the top surface 34 at an angle other than 90 degrees, such that the wall surface 36 extends radially outwardly from the top surface 34. Such a configuration enables the interior I of the carrier 10 to increase in a downward direction, as shown n FIG. 7. This structure forms an increased interior area for the animal A, while reducing the overall top surface of the carrier 10. In one embodiment, the top portion 16 can have a stepped configuration in which the top portion 16 has a series of rings 16a-16c that increase in cross sectional area in the downward direction. The sides of each of these rings 16a-16c can have an arcuate configuration. The bottom of the top portion 16 is defined by ring 16c having an increased diameter or the largest diameter. The ring 16c thus forms an edge 38 that extends slightly outwardly.

As can be understood, the top portion 16, when inverted has the same basic configuration as the bottom portion 14, such that the bottom portion 14 is capable of fitting into an interior of the top portion 16 when the bottom portion 14 is inverted. Such a configuration saves space for storage and shipping purposes.

Figure 11:
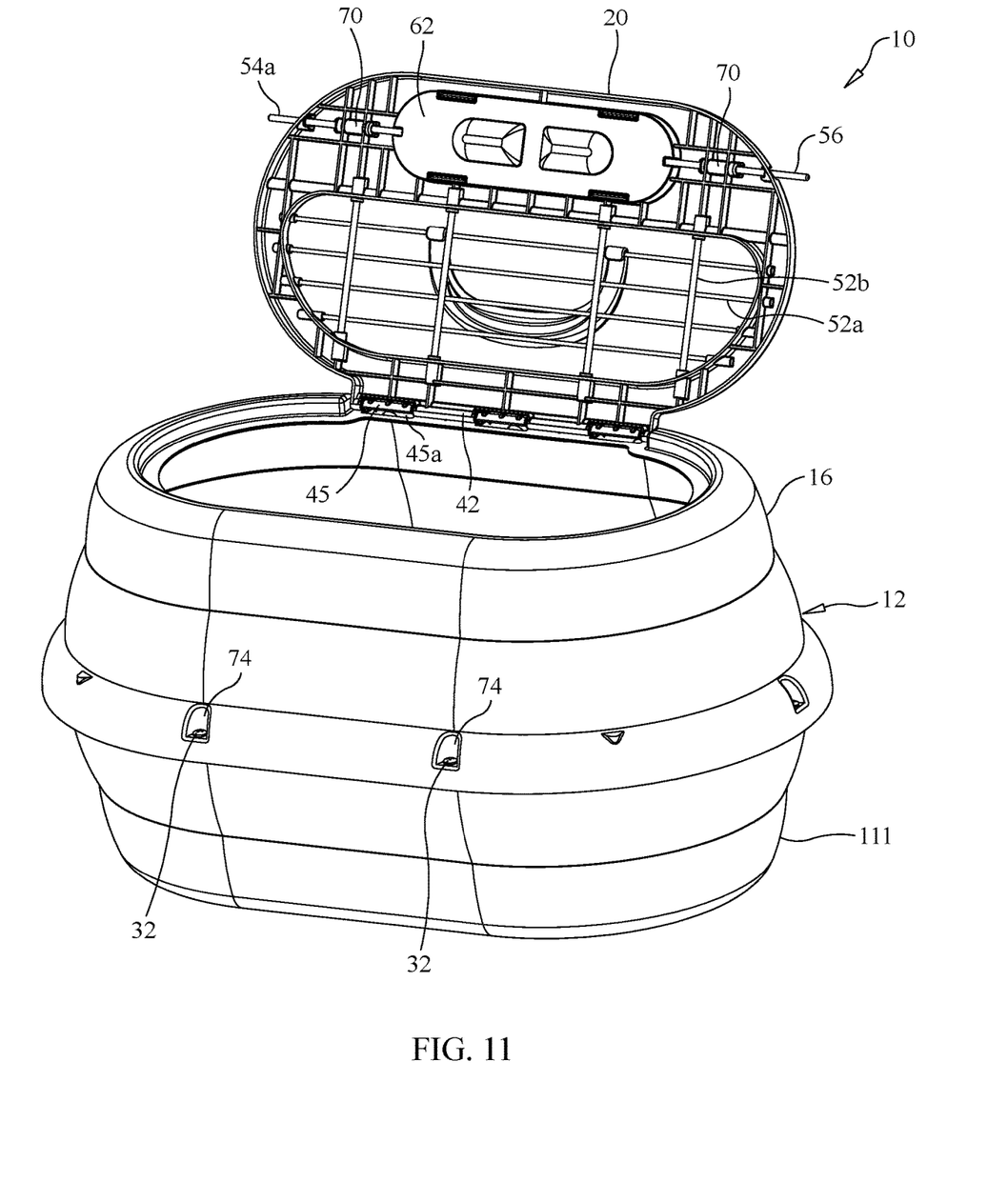
FIG. 11 is a top perspective view of the carrier of FIG. 1, with the cover portion in an opened configuration.
Figure 12:
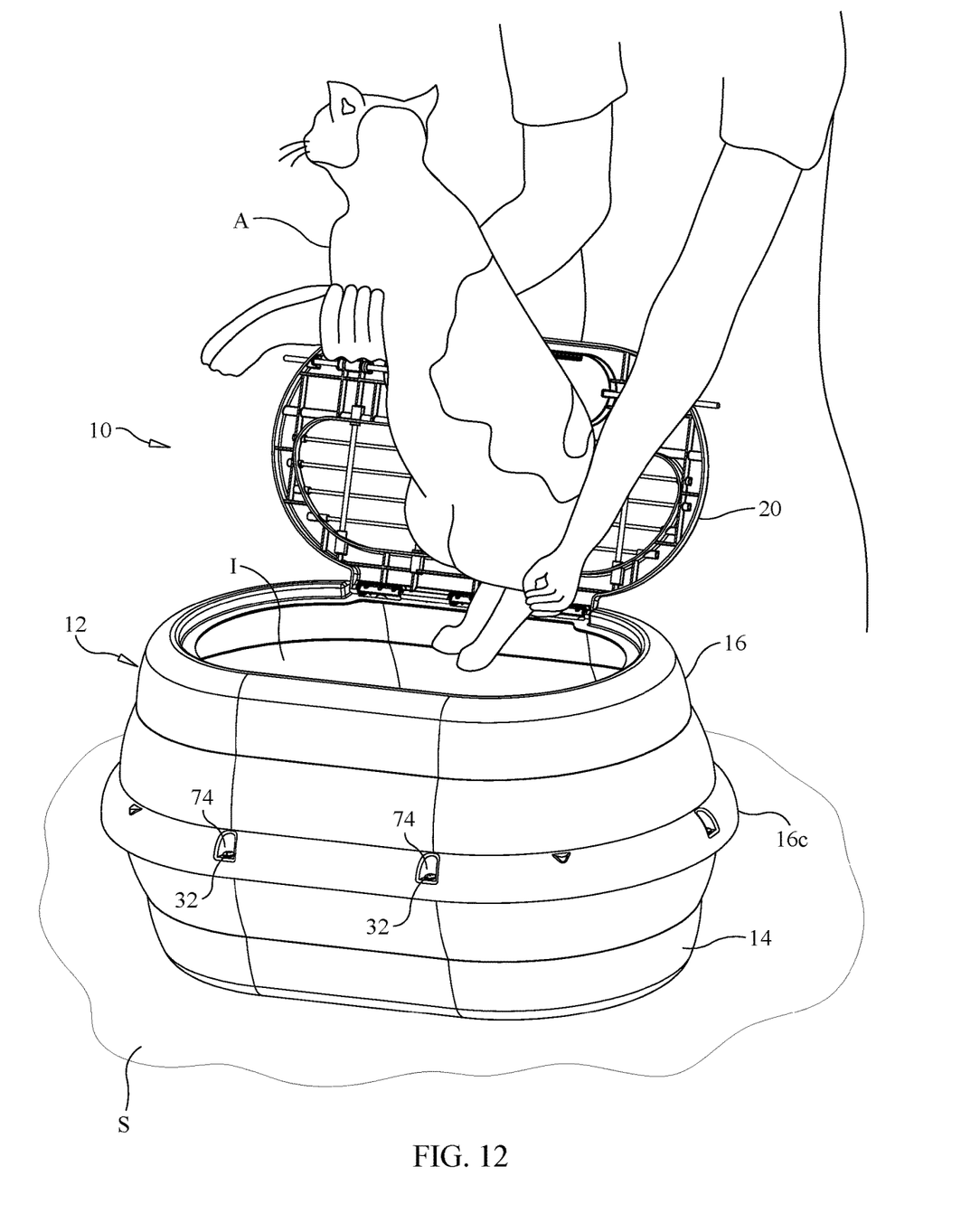
FIG. 12 illustrates the entry of an animal into the carrier illustrated in the opened state in FIG. 11.

The top surface 34 of the top portion 16 can include the opening 18 therein. The opening 18 is the only opening in the carrier 10 that is sized and configured to enable an animal A to enter or exit the body 12. Furthermore, as shown in FIGS. 11 and 12, the opening 18 enables an animal A to enter or exit the body 12 in a vertical manner when the bottom portion 14 is placed on an exterior surface S. In one embodiment, the opening 18 has an inner circumference 40 such that the opening 18 has a generally oval shape or configuration. Specifically, in this embodiment the opening 18 can have a first straight edge 40a, a second straight edge 40b, a first curved part 40c and a second curved part 40d. The first straight edge 40a can include a first hinge structure 42 that connects the top portion 16 to the cover portion 20.

Figure 1:
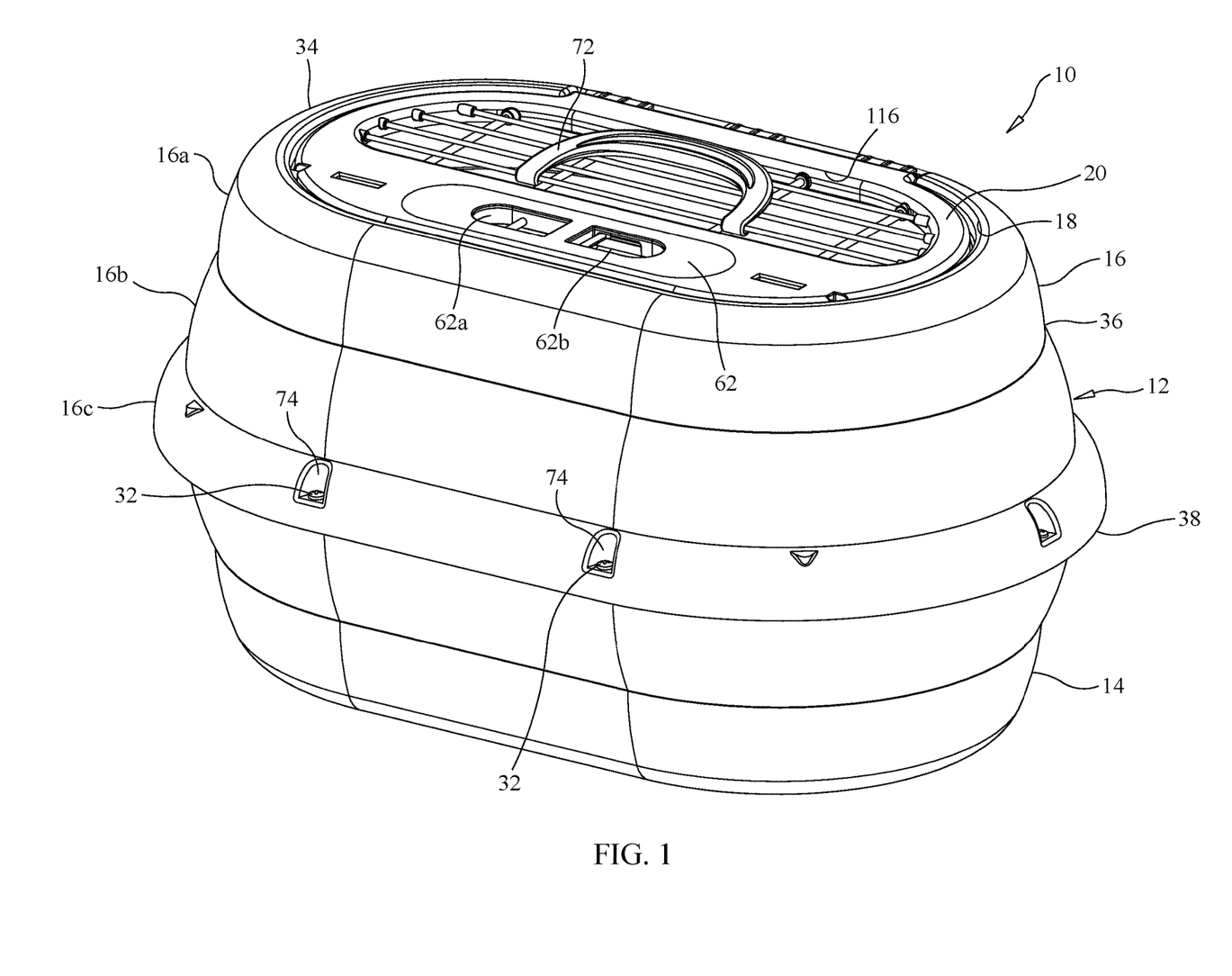
FIG. 1 is a top perspective view of the a carrier according to an embodiment of the present disclosure.
Figure 2:
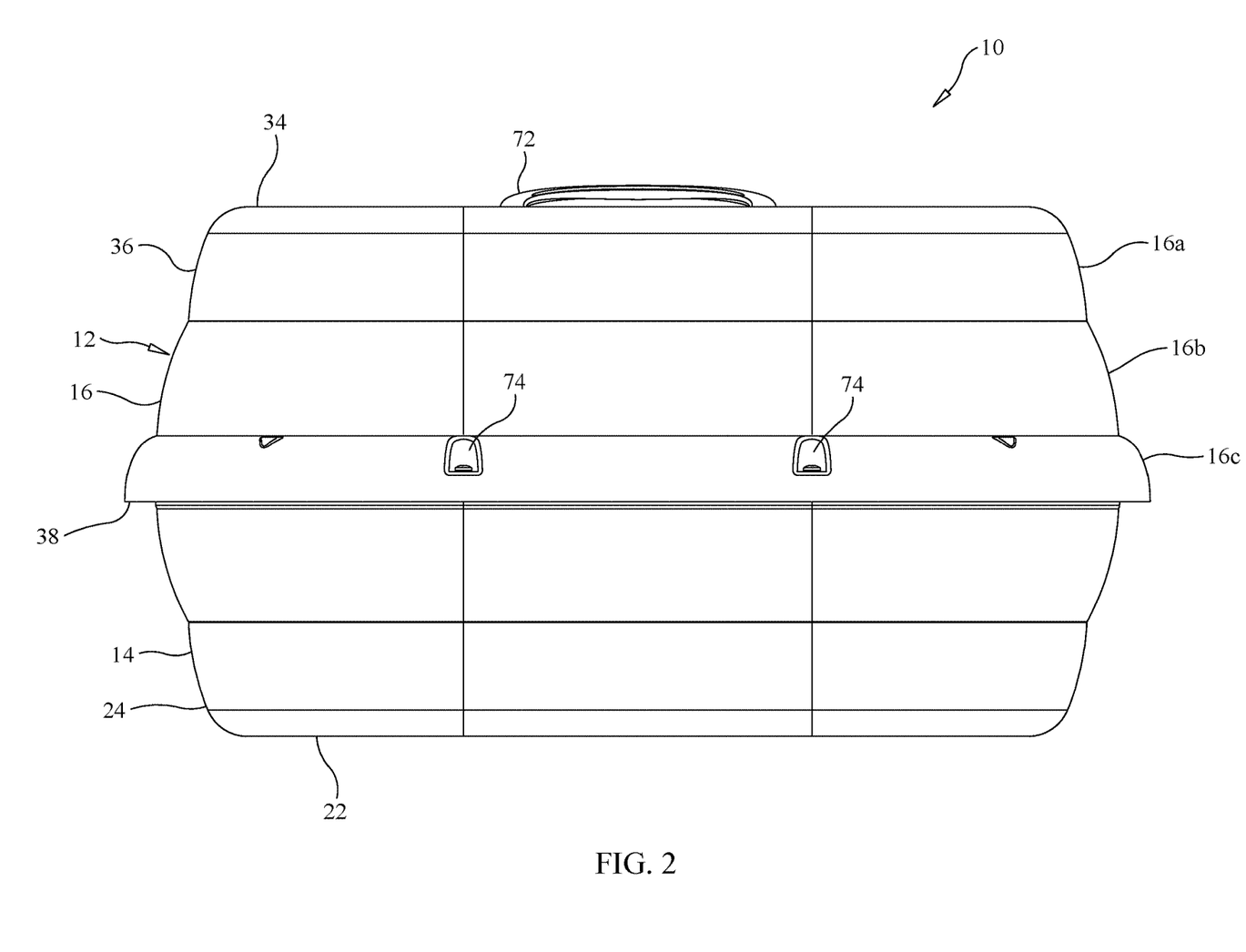
FIG. 2 is a side elevational view of the carrier of FIG. 1.
Figure 3:
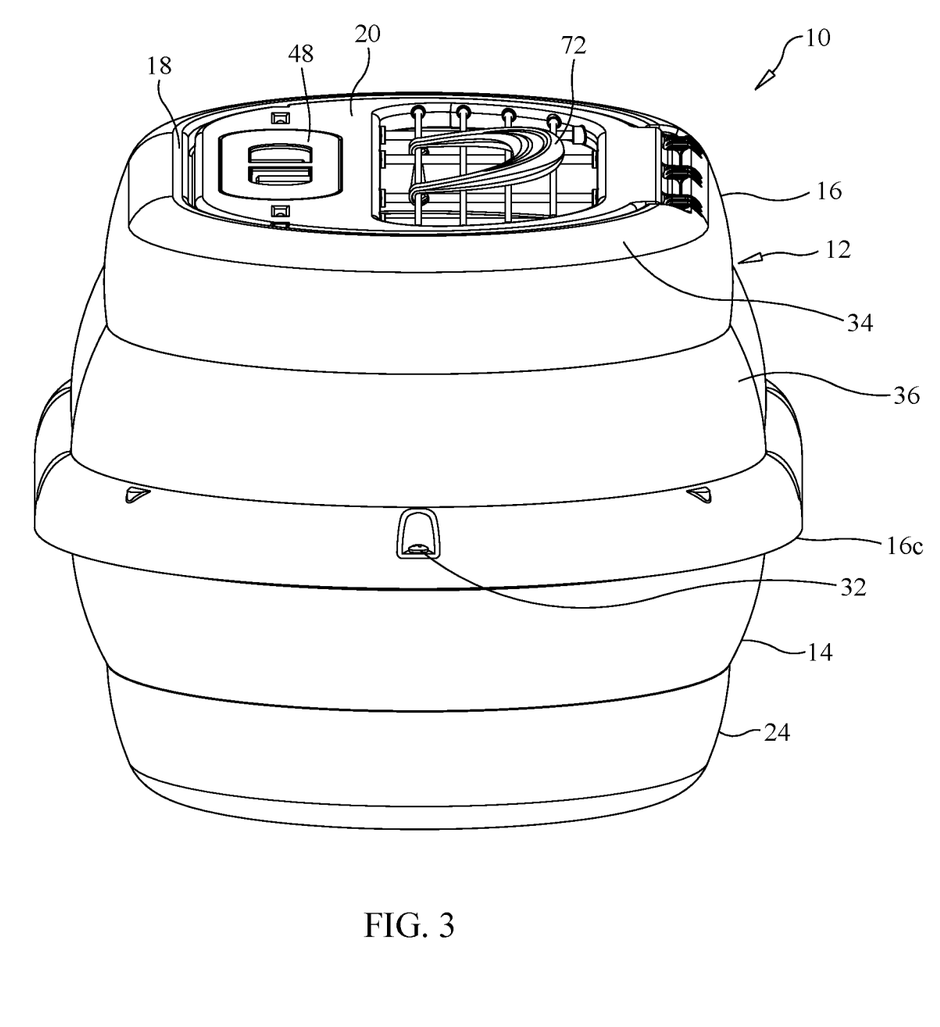
FIG. 3 is a front perspective view of the carrier of FIG. 1.
Figure 4:
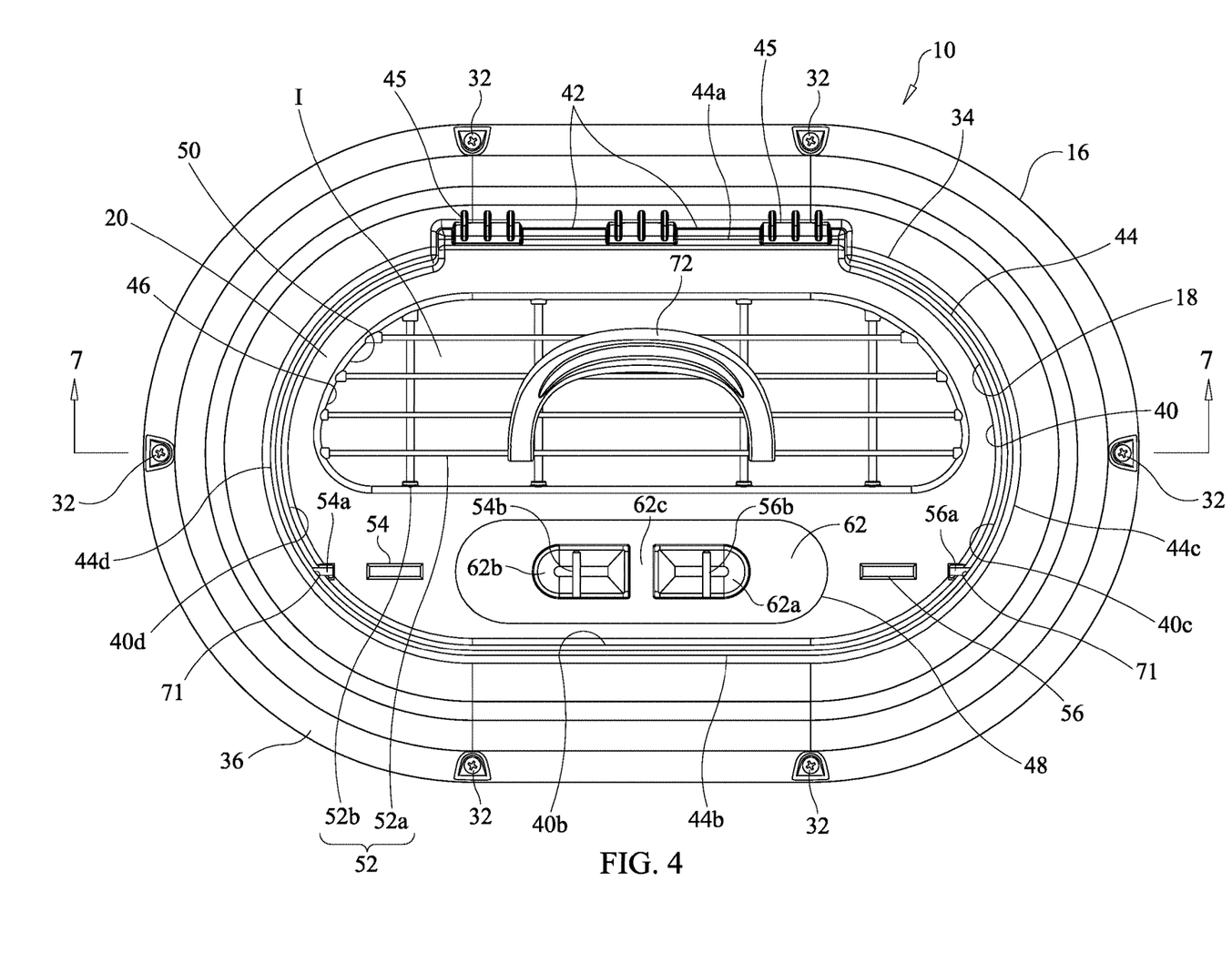
FIG. 4 is a top plan view of the carrier of FIG. 1.
Figure 5:
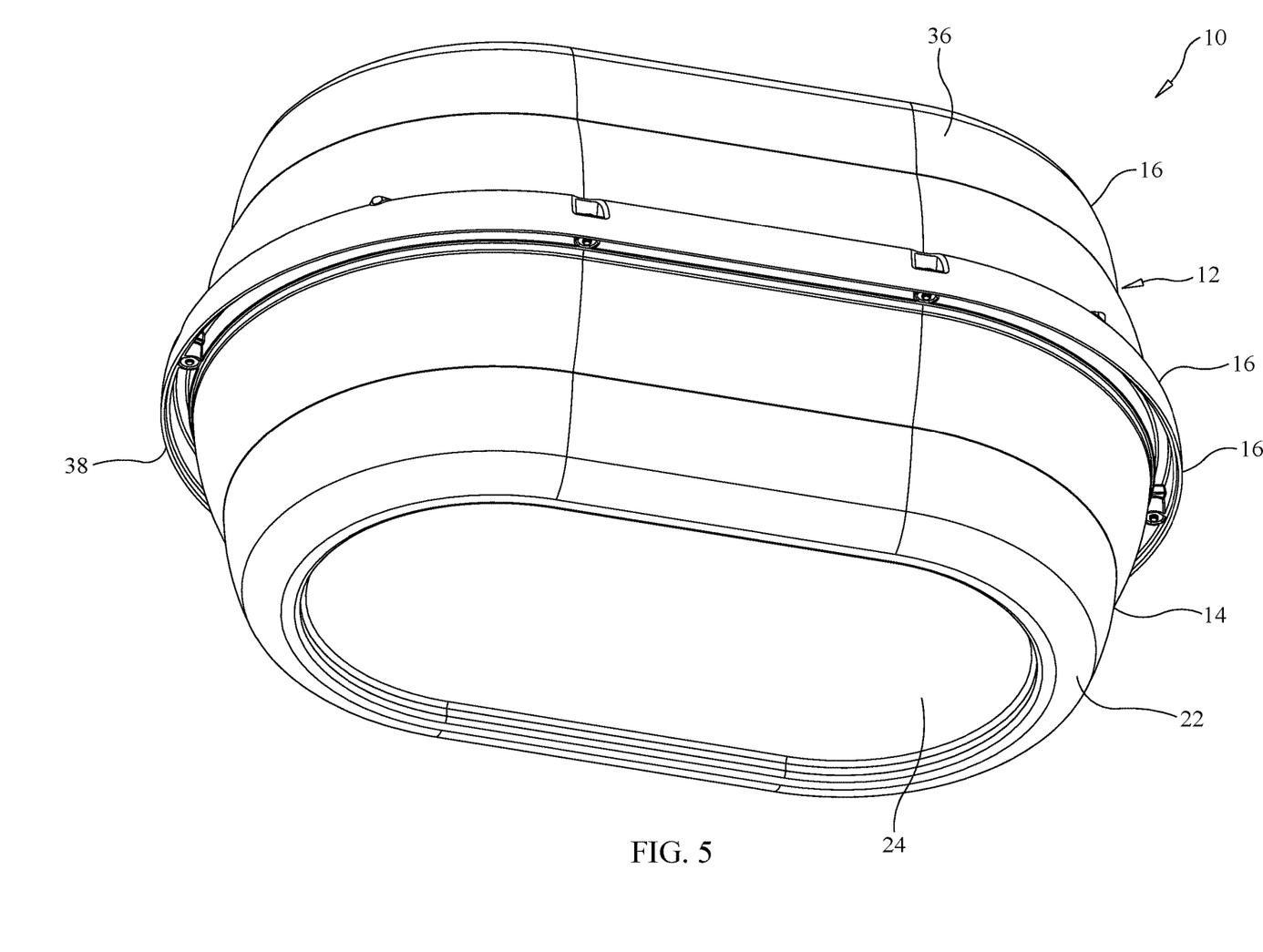
FIG. 5 is a bottom perspective view of the carrier of FIG. 1.
Figure 6:
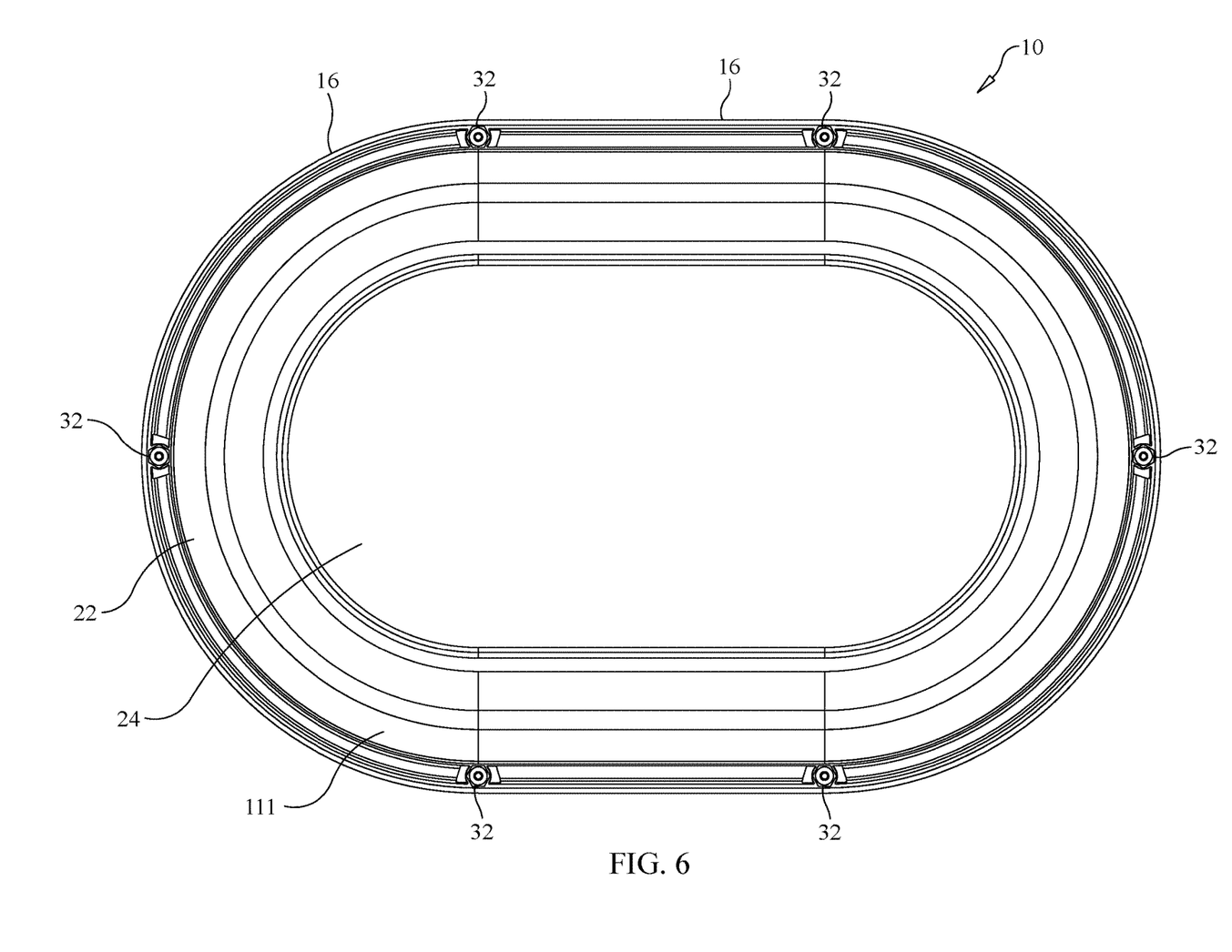
FIG. 6 is a bottom plan view of the carrier of FIG. 1.

As shown in FIGS. 3, 4 and 11, the cover portion 20 is sized and configured to fit within or cover the opening 18 in the top portion 16. Thus, as can be understood, the outer circumference 44 of the cover portion 20 has the same general shape as the inner circumference 40 of the opening 18. In one embodiment the cover portion 20 has an outer circumference such that the cover portion 20 has a generally oval shape or configuration. Specifically, in this embodiment the cover portion 20 can have a first straight edge or side 44a, a second straight edge or side 44b, a first curved part 44c and a second curved part 44d. The first straight edge 44d can include a second hinge structure 45 that interacts with the first hinge structure 42 to connect the top portion 16 to the cover portion 20.

The cover portion 20 is preferably molded plastic and can include an opening 46 and a locking or latching mechanism 48. As shown in FIG. 4, the opening 46 in the cover portion 20 has an outer periphery 50 that at least partially follows the contour of the outer circumference 44 of the cover portion 20. The opening 46, as shown in FIG. 4, is not centered within the cover 20. Specifically, the opening 46 (also referred to as viewing opening) is closer to the first straight edge or side 44a than to the second straight edge or side 44b of the cover 20, as shown in FIG. 4. Further, the opening 46 can have a plurality of wires or rods 52a and 52b that form a wire grating 52 to block the opening 46 so as to restrict passage through the opening 46. In one embodiment, the plurality of wires 52 include a set of vertical wires 52b and a set of horizontal wires 52a. The vertical wires 52b are transverse (or perpendicular) to the horizontal wires 52a. However, it is noted that the plurality of wires 52a and 52b can have any suitable configuration. The plurality of wires 52a and 52b restrict passage of the animal A through the opening in the cover portion 20, while also allowing the animal A to see through the opening 46. Seeing through the opening 46, enables the animal A to feel more at ease and calm. It is further noted that the opening 46 in the cover portion 20 can be blocked or restricted in any suitable manner with any suitable structure and in one embodiment, the opening 46 can be completely blocked or be nonexistent.

Figure 9:
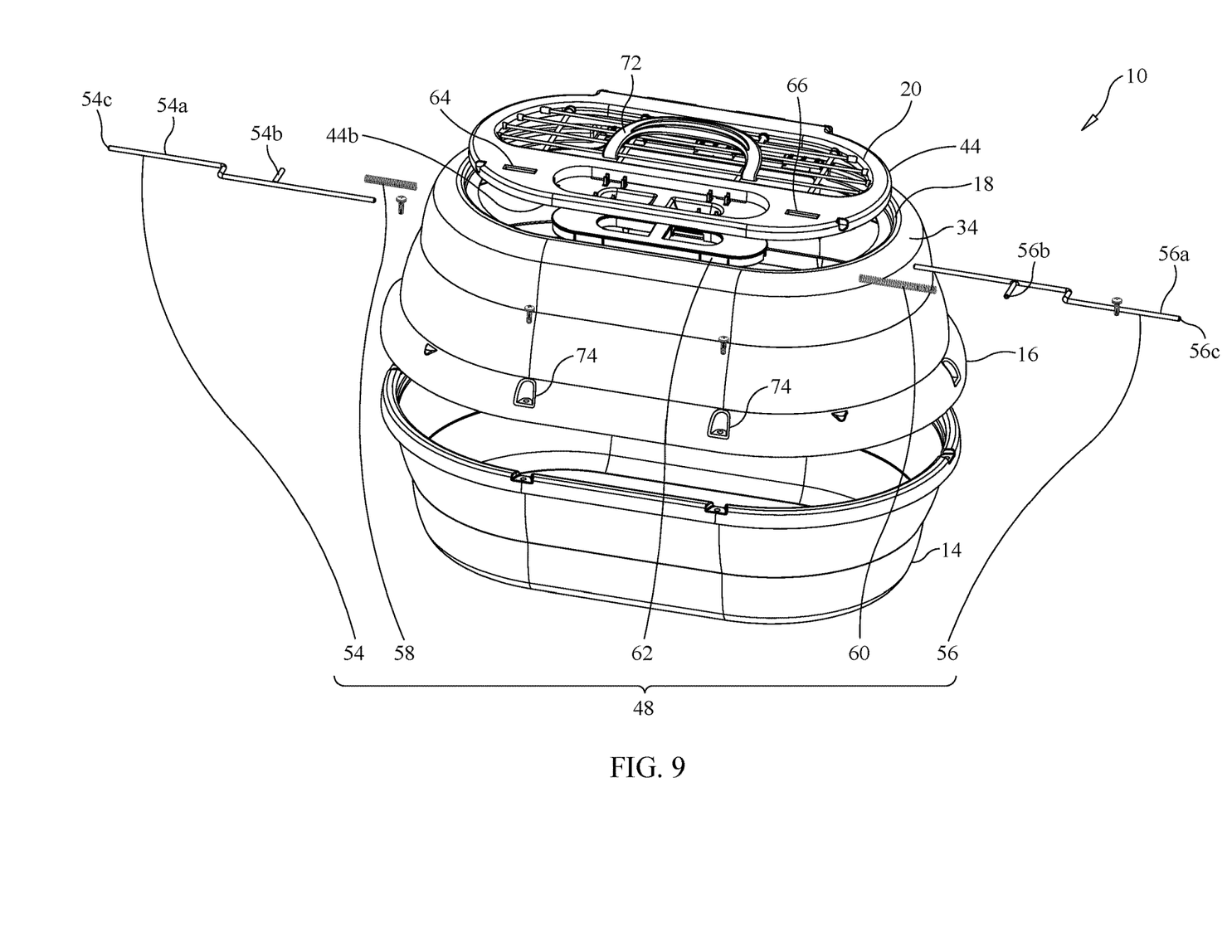
FIG. 9 is an exploded view of the carrier of FIG. 1.
Figure 10:
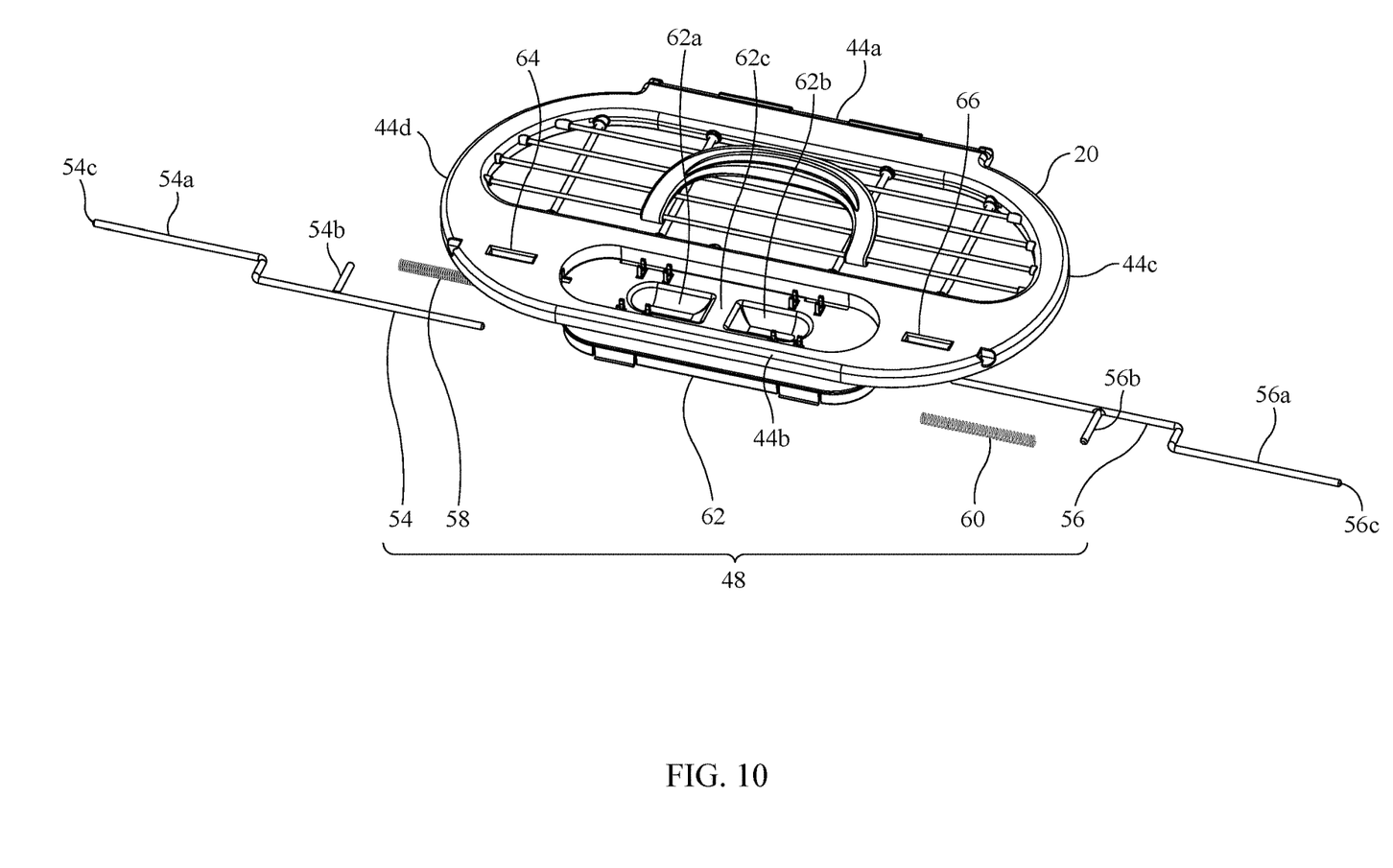
FIG. 10 is a top perspective view of the cover portion removed from the top portion of the carrier of FIG. 1, and the latching mechanism illustrated in an exploded view.

As shown in FIGS. 9 and 10, the locking mechanism 48 is disposed at the second straight edge 44b of the cover portion 20 and includes a first rod 54, a second rod 56, a first spring 58, a second spring 60, and an attaching structure 62. The attaching structure 62 is a plastic molded structure that is attached to the cover portion 20. The attaching structure 62 can be generally oval and includes a first recess 62a and a second recess 62b separated from the first recess 62a by a divider 62c. The cover portion 20 includes first and second passages 64 and 66 therein for the first and second rods 54 and 56.

The first and second rods 54 and 56 can be metal and can include longitudinal sections 54a and 56a and traverse sections 54b and 56b. The longitudinal sections 54a and 56a are disposed in the passages 64 and 66 in the attaching structure 62 with the transverse sections 54b and 56b disposed in a respective recess 62a and 62b. The longitudinal sections 54a and 56a have a sufficient length to extend out of the passages 64 and 66 in the attaching structure 62 and into an opening 71 in the inner circumference 40 of the opening 18 in the top portion 16 to lock the cover portion 20 in a closed state to restrict passage through the opening 18 in the top portion 16. As shown in FIG. 11, the rods 64 and 56 can be attached to at least one (or a plurality) of the plurality of wires 52a and 52b with a support structure 70 to support and hold the rods 54 and 56 in place.

A handle 72 can be attached to at least one of the plurality of wires 52a and 52b. The handle 72 can be hingedly attached to a wire so that the handle 72 lays flat against some of the plurality of wires 52a and 52b and/or a portion of the cover portion 20. The handle 72 can be arcuate in shape and have an ergonomic configuration to fit comfortably in the hand of a user. Further the handle and the connection to the plurality of wires is sufficiently strong to enable the carrier 10 to be carried with an animal A disposed in the interior I. As shown in FIG. 4, the handle 72 is centered with respect to the cover portion 20. However, because the opening 46 is not centered relative to the cover portion 20, the handle 72 is not centered relative to the wire grating 52 within the opening 46.

The carrier 10 is a molded product, in which the top portion 16, the bottom portion 14 and the cover portion 20 can be separately molded. The top portion 16 is formed with the opening 18, which, in one embodiment is the only opening sized and configured to enable an animal A to enter or exit the body 12 and enables an animal A to enter or exit the body 12 in a vertical manner when the bottom portion 14 is placed on the surface S.

The top portion 16 can be permanently, semi-permanently or removably attached to the bottom portion 14. In one embodiment, the top portion 16 is attached to the bottom portion 14 such that the edge 38 of the ring 61c extends over the outwardly extending portion 28. Fasteners or screws 32 can pass through recesses 74 in the ring 16c and into the outwardly extending portion 28 to attach the top portion 16 to the bottom portion 14.

The cover portion 20 can have the plurality of wires 52a and 52b permanently, semi-permanently or removably attached thereto and the handle 72 can be attached to the at least one of the plurality of wires 52a and 52b. The locking mechanism 48 can then be attached to the cover portion 20. The springs 58 and 60 are disposed such that they are between the transverse portions 54b and 56b and a surface of the attaching structure 62 to bias the rods 54 and 56 into the locked position. That is, the springs 58 and 60 are configured and arranged to bias the rods 54 and 56 outwardly such that the ends 54c and 56c of each of the rods 54 and 56 extends into the opening 71 in the inner circumference 40 of the opening 18 in the top portion 16, such that the locking mechanism 48 can be considered a spring loaded push button mechanism.

The cover portion 20 can be attached to the top portion 16 by connecting the first hinge structure 42 to the second hinge structure 45. In one embodiment, the first hinge structure 42 can be a generally cylindrical plastic molded member and the second hinge structure 45 can be an arcuate molded member that has an inner diameter that is substantially the same as the outer diameter of the first hinge structure 42. Thus, the second hinge structure 45 can be snap fit onto the first hinge structure 42. In one embodiment, the second hinge structure 45 extends more than 180 degrees around the first hinge structure 42 and less than 360 degrees around the first hinge structure 42 such that an opening or a gap 45a is formed in the circumference of the second hinge structure 45. Moreover, the second hinge structure 45 has a thickness to diameter ratio that enables the opening in the circumference to be expanded when the first hinge structure 42 is pressed into the opening and elastically snap back into place around the outer circumference of the first hinge structure 42.

To use the carrier 10, the user can place fingers (e.g., a fore finger and a thumb) into the recess 62a and 62b of the attaching structure 62 and simultaneously engage the transverse portions 54b and 56b of the first and second rods 54 and 56. The user can then squeeze the transverse portions 54b and 56b together against the biasing force of the springs 58 and 60. The ends 54c and 56c of the longitudinal portions 54a and 56a of the rods 54 and 56 will then retract out of the openings in the inner circumference 40 of the opening 18. Thus, the cover portion 20 is free to move in a hinged manner to enable the opening 18 to be exposed.

As shown in FIG. 12, the carrier 10 is configured to be placed on a surface S, with the opening 18 being the only opening sized and configured to enable an animal A to enter or exit the body 12 and enables an animal A to enter or exit the body 12 in a vertical manner. Thus, the animal A can enter or be placed into the interior I of the carrier 10 through the opening 18. Once the animal A is disposed in the interior I the cover portion 20 can be placed so as to block the opening 18 in the top portion 16 and the latching mechanism 48 can lock the cover portion 20 in the latched or locked state to prevent the animal A from exiting the carrier 10.

In one embodiment, the user can apply pressure to the transverse portions 54b and 56b to cause the ends 54c and 56c of the rods 54 and 56 to be withdrawn and release the pressure once the cover portion 20 is properly positioned. Alternatively, the inner circumference 40 of the opening 18 in the top portion 16 can include slanted surfaces that are capable of engaging the ends 54c and 56c of the rods 54 and 56 such that the ends 54c and 56c of the rods 54 and 56 slides there along and are biased inwardly against the springs 58 and 60. Once the cover portion 20 is positioned in the opening 18 in the top portion 16 the ends 54c and 56c of the rods 54 and 56 engage and enter the openings in the inner circumference 40 of the opening 18 in the top portion 16.

The embodiments disclosed herein provide a carrier with a single top loading opening for animals that reduces or eliminates the resistance from animals, resulting in an easier and safer situation in which an animal can be loaded. The carrier further provides a safe and secure carrier for an animal.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "front", "downward", "vertical", "horizontal", and "transverse" as well as any other similar directional terms refer to those directions relative a carrier 10. Accordingly, these terms, as utilized to describe the present invention should be interpreted relative to a carrier 10.

The term "configured" as used herein to describe a component, section or part of a device includes hardware and/or software that is constructed and/or programmed to carry out the desired function.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A carrier comprising:
a body with a bottom portion and a top portion, the top portion defining a top opening having a first top side, the bottom portion configured to be placed on a surface, the top opening being an only opening in the top portion that (a) is sized and configured to enable an animal to enter or exit the body and (b) enables an animal to enter or exit the body in a vertical manner when the bottom portion is placed on a surface;
a cover portion sized and configured to open and close the top opening, the cover portion having a first cover side, a second cover side, a viewing opening therein, an attachment opening therein, and a first passage and a second passage located on opposite sides of the attachment opening, the first passage and the second passage defining a plane, an entirety of the first passage and the second passage extending within the plane, the viewing opening extending along the plane, the first cover side of the cover portion being attached to the top portion of the body at the first top side of the top opening by a hinge, the viewing opening being off-centered within the cover portion and closer to the first cover side than to the second cover side, the viewing opening having a wire grating that restricts passage through the viewing opening with a carrier handle hingedly connected to the wire grating, the carrier handle being off-center relative to the wire grating and centered relative to the cover portion; and
a latching mechanism installed to a latch supporting portion of the cover portion closer to the second cover side than to the first cover side, the latching mechanism being manually operable to retain the cover portion in a latched state to close the top opening and to release the cover portion such that the cover portion is free to move about the hinge to provide access to the top portion via the top opening, the latching mechanism including:
an attaching structure attached to the cover portion at the attachment opening so as to be spaced apart from the viewing opening,
at least one recess,
a first rod having a first transverse section, a first end, and a first longitudinal section extending at least between the first transverse section and the first end, the first transverse section and the first longitudinal section extending along the plane, and
a second rod having a second transverse section, a second end, and a second longitudinal section extending at least between the second transverse section and the second end, the second transverse section and the second longitudinal section extending along the plane,
the first longitudinal section extending through the first passage in the cover portion and the second longitudinal section extending through the second passage in the cover portion,
the first transverse section and the second transverse section extending into the at least one recess such that a user can insert one or more fingers into the at least one recess to squeeze the first transverse section and the second transverse section towards each other to release the first end from the top portion as the first longitudinal section translates within the first passage and the second end from the top portion as the second longitudinal section translates within the second passage.

2. The carrier according to claim 1, wherein;
the wire grating at least partially blocks the viewing opening in the cover portion.

3. The carrier according to claim 1, wherein:
the bottom portion is detachable from the top portion.

4. The carrier according to claim 1, wherein:
the latching mechanism includes at least one spring that biases the first rod and the second rod away from each other.

5. The carrier according to claim 1, wherein:
the top portion includes an edge configured to overlap an outside periphery of the bottom portion.

6. The carrier according to claim 1, wherein:
the bottom portion is sized and configured to fit within an interior of the top portion when the bottom portion is inverted.

7. The carrier according to claim 1, wherein:
the first transverse section extends outwardly from a first intermediate portion of the first longitudinal section, and the second transverse section extends outwardly from a second intermediate portion of the second longitudinal section.

8. The carrier according to claim 1, wherein;
the top opening has an oval shape with the first top side and a second top side being substantially straight, the first top side opposite the second top side, and
the attachment opening also has an oval shape with the first cover side and the second cover side being substantially straight.

9. The carrier according to claim 1, wherein:
the at least one recess includes a first recess and a second recess separated by a divider,
the first transverse section translates within the first recess, and
the second transverse section translates within the second recess.

10. The carrier according to claim 1, wherein the first rod includes:
a third transverse section extending from the first longitudinal section,
a third end, and
a third longitudinal section extending from the third transverse section to the third end, the third longitudinal section and the third transverse section extending along the plane.

11. The carrier according to claim 10, wherein the second rod includes:
a fourth transverse section extending from the second longitudinal section,
a fourth end, and
a fourth longitudinal section extending from the fourth transverse section to the fourth end, the fourth longitudinal section and the fourth transverse section extending along the plane.

12. The carrier according to claim 1, wherein the latching mechanism is not coupled to or formed by the wire grating.

13. A method of forming a carrier, the method comprising:
forming a bottom portion, the bottom portion configured to be placed on a surface;
forming a top portion with a top opening, the top opening having a first top side and being an only opening sized and configured to enable an animal to enter or exit the carrier and enables an animal to enter or exit the carrier in a vertical manner when the bottom portion is placed on a surface;
positioning a cover portion to selectively provide access to the top portion via the top opening, the cover portion having a first cover side, a second cover side, a viewing opening therein, an attachment opening therein, and a first passage and a second passage located on opposite sides of the attachment opening, the first passage and the second passage defining a plane, an entirety of the first passage and the second passage extending within the plane, the viewing opening extending along the plane, the cover portion being attached to the top portion by a hinge that is attached to the top portion at the first top side of the top opening, the viewing opening being off-centered within the cover portion and closer to the first cover side than to the second cover side, the viewing opening having a wire grating that restricts passage through the viewing opening with a carrier handle hingedly connected to the wire grating, the carrier handle being off-center relative to the wire grating and centered relative to the cover portion; and
installing a latching mechanism to a latch supporting portion of the cover portion closer to the second cover side than to the first cover side, such that the latching mechanism is manually operable to retain the cover portion in a latched state to close the top opening in the top portion and to release the cover portion such that the cover portion is free to move about the hinge to provide access to the top portion via the top opening, the latching mechanism including:
an attaching structure attached to the cover portion at the attachment opening so as to be spaced apart from the viewing opening,
at least one recess,
a first rod having a first transverse section, a first end, and a first longitudinal section extending at least between the first transverse section and the first end, the first transverse section and the first longitudinal section extending along the plane, and
a second rod having a second transverse section, a second end, and a second longitudinal section extending at least between the second transverse section and the second end, the second transverse section and the second longitudinal section extending along the plane,
the first longitudinal section extending through the first passage in the cover portion and the second longitudinal section extending through the second passage in the cover portion,
the first transverse section and the second transverse section extending into the at least one recess such that a user can insert one or more fingers into the at least one recess to squeeze the first transverse section and the second transverse section towards each other to release the first end from the top portion as the first longitudinal section translates within the first passage and the second end from the top portion as the second longitudinal section translates within the second passage.

14. The method according to claim 13, wherein:
the wire grating at least partially blocks the viewing opening in the cover portion.

15. The method according to claim 13, wherein:
the latching mechanism includes at least one spring that biases the first rod and the second rod away from each other.

16. The method according to claim 13, wherein;
the top portion includes an edge configured to overlap an outside periphery of the bottom portion.

17. The method according to claim 13, further comprising:
inverting the bottom portion and positioning the bottom portion within an interior of the top portion.

18. The method according to claim 13, wherein;
the first transverse section extends outwardly from a first intermediate portion of the first longitudinal section, and
the second transverse section extends outwardly from a second intermediate portion of the second longitudinal section.

19. The method according to claim 13, wherein:
the top opening has an oval shape with the first top side and a second top side being substantially straight, the first top side opposite the second top side, and
the attachment opening also has an oval shape with the first cover side and the second cover side being substantially straight.

20. The method according to claim 13, wherein:
the at least one recess includes a first recess and a second recess separated by a divider, the first transverse section translates within the first recess, and the second transverse section translates within the second recess.

* * * * *